United States Patent [19]

Davison

[11] Patent Number: 4,489,034

[45] Date of Patent: Dec. 18, 1984

[54] THERMOFORMING PROCESS USING MODIFIED POLYMER BLEND

[75] Inventor: Sol Davison, Houston, Tex.

[73] Assignee: Shell Oil Company, Houston, Tex.

[21] Appl. No.: 411,165

[22] Filed: Aug. 25, 1982

[51] Int. Cl.³ .............................................. B29F 1/08
[52] U.S. Cl. ................................. 264/331.15; 525/240
[58] Field of Search ................... 264/291, 292, 331.15; 525/240

[56] References Cited

U.S. PATENT DOCUMENTS

| | | | |
|---|---|---|---|
| 3,277,224 | 10/1966 | Whiteford | 264/291 |
| 3,641,215 | 2/1972 | Usamoto et al. | 525/240 |
| 3,758,643 | 9/1973 | Fischer | 525/240 |
| 3,806,558 | 4/1974 | Fischer | 525/240 |
| 3,808,304 | 4/1974 | Schirmer | 525/240 |
| 3,836,607 | 9/1974 | Finkmann et al. | 525/240 |
| 3,849,520 | 11/1974 | Bullard et al. | 525/240 |
| 3,887,534 | 6/1975 | Baba et al. | 525/240 |
| 3,888,949 | 6/1975 | Shih | 525/240 |
| 3,966,860 | 6/1976 | Hudson et al. | 264/292 |
| 4,061,817 | 12/1977 | Maxel | 428/246 |
| 4,078,020 | 3/1978 | Rose et al. | 525/240 |
| 4,226,905 | 10/1980 | Harbourne | 525/240 |
| 4,248,651 | 2/1981 | Kojimoto et al. | 264/292 |
| 4,275,120 | 6/1981 | Weiner | 525/240 |
| 4,310,367 | 1/1982 | Berejka | 525/240 |
| 4,311,807 | 1/1982 | McCullough | 525/240 |
| 4,378,404 | 3/1983 | Liv | 525/240 |
| 4,378,451 | 3/1983 | Edwards | 525/240 |
| 4,380,607 | 4/1983 | Ikeda et al. | 525/240 |

*Primary Examiner*—Theodore Morris
*Assistant Examiner*—W. Thompson
*Attorney, Agent, or Firm*—Dean F. Vance

[57] ABSTRACT

An improved thermoforming process comprises the use of crystalline polymer sheets prepared by the peroxide reacting of the mixture of a poly(alpha olefin) selected from polypropylene and polybutylene plus a polyethylene.

19 Claims, No Drawings

THERMOFORMING PROCESS USING MODIFIED POLYMER BLEND

BACKGROUND OF THE INVENTION

There has been an ever increasing need in the automotive industry to reduce the weight of automobiles and hence reduce gasoline consumption. This need has resulted in the replacement of many metal parts with plastic parts. See, e.g., Welch, U.S. Pat. No. 3,850,474. While many of the plastic parts presently used in automobiles have been produced by well known injection molding and extrusion techniques, it would be very desirable if these plastic parts could be produced by the same technique, and even the same machinery used for making the metal parts—i.e., stamping. However, for a variety of reasons, any significant conversion from stamping metal parts to stamping plastic parts has not occured.

As discussed in Canadian Pat. No. 1,013,527, the following sequence of steps are typically employed in stamping:

(1) the plastic sheet or blank is heated to a temperature which is above the melting temperature of softening point and below the decomposition point of the plastic;

(2) the heated sheet is transferred to a cold mold of a mechanical stamping press where a set of dies therein has the desired configuration of the intended shaped articles;

(3) the press is closed for a period of time sufficient to cause the sheet to fill the die cavity and to cool the part to retain the desired shape of the die cavity; and (4) the press is opened and the molded article is ejected.

An alternative, related form of fabrication, used in so-called "thermoforming" of plastic sheets is "vacuum forming" wherein the softened plastic sheet is drawn into a mold by air pressure and a mating portion of the mold is not required.

One of the major problems in stamping thermoplastic sheets is controlling the temperature during transfer to the dies and during closure of the dies. The desired thermoplastic materials such as polypropylene have a relatively sharp cyrstalline melting point. Accordingly, when temperatures exceed about 5° above the melting point of the polymer, the sheet sags and becomes difficult if not possible to transfer from the heater to the mold. However, if the temperature is too low, e.g., only 1 or 2 degrees above the melting point, then the polymer will not flow into the interstices of the die and will snap back when the die is removed. This very narrow control range of 2 to 5 degrees above the crystalline melting point, while frequently manageable in a controlled laboratory environment, cannot be readily adapted to commercial practices. What is needed is a means to permit heating the polymer to higher temperatures above the melting temperature or softening point that is commercially manageable without also resulting in a drastic loss of melt strength and problems with sheet transfer and sagging sheets. Generally, what is required is a broader "temperature window" for processing; namely, a larger range of temperatures within which a satisfactory balance between sheet sag and in-mold flow is maintained. Further, there is also a need for a polymer sheet which can be more easily thermoformed into an article having an intricate pattern.

SUMMARY OF THE INVENTION

An improved process for manufacturing molded articles by thermoforing crystalline polymer sheet is disclosed. The improved process comprises the thermoforming of crystalline polymer sheets at elevated temperatures where the sheets are extrusion produced from the peroxide-reacted mixture of about 50 to about 96 percent by weight of a crystalline isotactic poly(alpha olefin) selected from the group consisting of polypropylene and polybutylene, and about 50 to about 4 percent by weight of a polyethylene. In order to make the desired mixture, the polyethylene is typically blended with the poly (alpha olefin) in an extruder in the presence of a small amount of peroxide, with or without other ingredients such as impact improvers, plasticizers, fillers and stabilizers. The reaction takes place during shear at elevated temperatures. Molecules of the poly-(alpha olefin) component are randomly scissioned (cracked), increasing melt flow and ease of processing of this component. At the same time, molecules of the polyethylene component are crosslinked, increasing its average molecular weight and elastic response in the melt state. Because of favorable viscosity conditions, a more or less continuous phase is set up coexistent with that of the poly(alpha olefin) (i.e., an interpenetrating network or IPN). The effect of the more or less continuous high molecular weight phase of polyethylene is to provide a skeletal structure for the poly(alpha olefin) melt to improve melt strength and to reduce melt sag. Also, because of the presence of the lower melting polyethylene, temperatures closer to the melting point of the polypropylene may be achieved in the preheated sheets used for the thermoforming operation. This allows a wider operating range for precision control of sag or droop required in the forming step. Reduction of average molecular weight of poly(alpha olefin) and increase of average molecular weight of the polyethylene in the peroxide-reacted mixture was confirmed by high temperature gel permeation chomatography (HTGPC). In a preferred embodiment, the crystalline isotactic poly(alpha olefin) is polypropylene, the polyethylene is high density polyethylene and the thermoforming process is stamping.

The process according to the present invention has significant commerical implications. The peroxide-reacted polymer composition has a higher melt flow than does the unreacted poly(alpha olefin) alone. This high melt flow material is easier to form sheets from and is easier to thermoform with since it more easily "flows" into the interstices of the mold. However, even though it is a higher melt flow material, it still retains excellent sag resistance during the heat cycle in the thermoforming process, similar in effect to poly(alpha olefin) sheets of fractional or lower melt flow. This combination of property advantages are unexpected advantages since one skilled in the art would not expect a higher melt flow poly(alpha olefin) sheet whether cracked or uncracked to have acceptable sag resistance during thermoforming.

DETAILED DESCRIPTION OF THE INVENTION

The process of the present invention involves the thermoforming of certain plastic sheets. There are as a minimum two polymeric components in the sheet---polyethylene and a crystalline isotactic poly(alpha olefin). Although high density polyethylene is preferred over low density polyethylene because of greater stiffness, low density polyethylene can also be used to achieve thermoforming benefits in these blends.

The high density polyethylenes useful herein have melt indices between about 0.1 and 30 and a density greater than about 0.94 grams per cubic centimeter (g/cm³). Typical high density polyethylenes have densities of around 0.95 to 0.96, a crystalline melting point of over about 130° C., and a molecular weight of between about 40,000 and 1,000,000. Melt index is important in that it relates to the viscosity characteristics of the polyethylene.

The low density polyethylenes useful herein should have melt indicies between about 0.1 and 5.0 preferably, with values comparable to that of the polypropylene, measured under equivalent conditions and a density below about 0.94 grams per cubic centimeter.

The poly(alpha-olefin) is selected from the group consisting of polypropylene and polybutylene.

The polypropylene employed is the so-called isotactic polypropylene as opposed to attactic polypropylene. This polyopropylene is described in Kirk-Othmer Encyclopedia of Chemical Technology, Volume 14, pages 217–335 (1967) and in U.S. Pat. No. 3,112,300. The weight average molecular weight of the polypropylene employed is typically in excess of about 100,000. The polypropylene suitable for this invention may be prepared using methods well known in the art. Depending on the specific catalyst and polymerization conditions employed, the polymer produced may contain atactic as well as isotactic, syndiotactic or so-called stereo-block molecules. These may be separated, if desired, by selective solvent extraction to yield products of low atacic content that crystallize more completely. The preferred commericial polypropylenes are generally prepared using a solid, crystalline, hydrocarbon-insoluble catalyst made from a titanium trichloride composition and an aluminum alkyl compound, e.g., triethyl aluminum or diethyl aluminum chloride. If desired, the polypropylene employed may be a copolymer containing minor (1 to 20 percent by weight) amounts of ethylene or other alpha olefin comonomers. Also included are impact polypropylenes, which structures are well known in the art.

The polybutylene also has an isotactic structure. The catalysts used in preparing the polybutylene (or poyl(1-butene)) are typically organonmetallic compounds commonly referred to as Ziegler-Natta catalysts. A typical catalyst is the interacted product resulting from mixing equimolar quantities of titianium tetrachloride and triethylaluminum. The manufacturing process is normally carried out in an inert diluent such as hexane. Manufacturing operations, in all phases of polymer formation, are conducted in such a manner as to guarantee rigorous weight of the polybutylene is typically in excess of about 30,000.

The relative amounts of poly(alpha-olefin) and high density polyethylene are shown below (the sum of the poly(alpha-olefin) and polyethylene being 100%):

|  | Preferred | More Preferred | Most Preferred |
|---|---|---|---|
| Poly(alpha-olefin) | 96 to 50% | 90 to 60% | 85 to 70% |
| Polyethylene | 4 to 50% | 10 to 40% | 15 to 30% |

The polyethylene is typically blended with the poly(alpha olefin) in an extruder in the presence of a small amount of peroxide, therein cracking the poly(alpha-olefin) and crosslinking the polyethylene.

Peroxide-reacting refers to the process of contacting the polymer blend in an extruder in the presence of a small but effective amount of a free-radical initiator (i.e., a peroxide). Standard techniques for the peroxide cracking of polymers in an extruder are well known and include the processes disclosed in U.S. Pat. No. 3,144,436 and U.S. Pat. No. 3,887,534. Preferred peroxides are those which have relatively high decomposition temperatures and produce volatile decomposition products, the latter being relatively non-toxic and with minimal residual odor. The peroxide of choice is 2,5-dimethyl-2,5-di(t-butylperoxy)hexane. (Lupersol 101, manufactured by Lucidol, a division of the Pennwalt Co.) Other peroxides of intereset include those which have half-lives of decomposition of the order of seconds at the reaction temperature (about 230° C.) but which are safely stable at storage and ambient temperatures. Decomposition products should preferably be volatile and relatively non-toxic. Many peroxides fit this catergory and choice is determined by economic considerations and physical form of the peroxide relative to efficiency of utilization. Many of the peroxides that are compatible with this invention are dialkyl peroxides but are not limited to this class. Specific examples manufactured by the Lucidol Company are dicumyl are dicumyl peroxide (Luperox 500), di-t-butyl peroxide, t-butyl cumyl peroxide (Lupersol 801) and 2,5,dimethyl-2,5-bis(t-butylperoxy)hexyne-3 (Lupersol 130). The amount of peroxide and the cracking temperature depend upon the melt flows of the starting polymers and the desired melt flow of the final composition. Typical amounts of peroxide are between about 150 parts by weight per million parts by weight total polymer (ppmw) and about 1000 ppmw, preferably between about 150 ppmw and about 200 ppmw. Typical cracking temperatures are between about 190° C. and about 250° C., preferably between about 220° C. and about 240° C.

The peroxide cracking aspect of the present invention differs from that taught in the U.S. Pat. Nos. 3,144,436 and 3,887,534 in that while the melt flow of the poly(alpha olefin) component is increased, the melt flow of the polyethylene component is actually decreased since the polyethylene undergoes crosslinking in the presence of the peroxide, thereby increasing its molecular weight. Crosslinking level is held well below the "gel-point" above which a three-dimensional network would be produced, thereby ruining ability for good melt processing.

Additional components may be added to the above compositions as long as the relative proportion of polyethylene to poly(alpha-olefin) remains within the ranges specified above. These polymer blends may be compounded further with other polymers, oils, fillers, blowing agents, reinforcements or impact modifiers such as rubbers and rubber/thermoplastic blends, antioxidants, stabilizers, fire retardants, antiblocking agents and other rubber and plastic compounding ingredients without departing from the scope of this invention. In a preferred embodiment, the impact modifier is a blend of a high density polyethylene and an ethylene/propylene rubber. Preferred amounts are about 5 to about 35% by weight impact modifier based on impact modifier plus poly(alpha olefin) plus polyethylene. Examples of various fillers that can be employed are in the 1971/1972 Modern Plastics Encyclopedia, pages 240/247. Reinforcements are also very useful in the present polymer blends. A reinforcement may be defined simply as the material that is added to a resinous matrix to improve the strength of the polymer. Most of these reinforcing materials are inorganic or organic products of high molecular weight. Various examples include glass fiber, asbestos, boron fibers, carbon and graphite fibers, whiskers, quartz and silica fibers, ceramic fibers, metal fibers, natural organic fibers, and synthetic organic fibers.

The above modified polymer mixtures are then extruded to form sheets typically having a thickness of greater than about 0.1 millimeters (mm), preferably about 0.2 mm to about 20 mm, more preferably about 1 mm to about 10 mm. This extrusion takes place in accordance with the extrusion methods customarily used for isotactic polypropylene and the like. The resulting extruded sheets are then thermoformed into molded articles according to the present invention.

Preferred thermoforming temperature ranges are temperatures from about the melting point of the crystalline poly(alpha olefin) to 60° C. above said melting point, more preferably from the melting point up to 40° C. above the melting point, most preferably between 5° C. and 20° C. above the melting point. For example, where the crystalline polymer is isotactic polypropylene having a crystalline melting point of 170° C., the preferred thermoforming temperatures are between 170° C. and 230° C., more preferably between 170° C. and 210° C., and most preferably between 175° C. and 190° C.

The thermoforming processes contemplated herein include vacuum molding, plug molding, vacuum molding with plug assist, blow molding, stamping and the like. The present invention is particularly well suited for stamping operations, such as those disclosed in U.S. Pat. No. 4,061,817 and Canadian Pat. No. 1,013,527. Vacuum forming of polypropylene sheet is disclosed in U.S. Pat. No. 3,157,719.

An essential part of the present invention is the temperature control of the plastic sheet during the thermoforming process. The other conditions for thermoforming, such as pressure, residence time, type of machinery, and the like may be determined by one skilled in the art of thermoforming or stamping by reference to the various patents cited herein and elsewhere.

To illustrate the present invention, the following illustrative embodiments are given. It is to be understood, however, that the embodiments are given for illustration only and the invention is not to be regarded as limited to any of the specific materials or conditions used in the specific embodiments.

ILLUSTRATIVE EMBODIMENT I

Illustrative Embodiment I discloses the effect that varying the amount of peroxide has on the melt flow of polypropylene/polyethylene blends of various compositions. In each case the polymer composition comprised a crystalline isotactic polypropylene (Shell PP-5520 having a melt flow of about 4.9) and a high density polyethylene (LB-861 manufactured by U.S. Industrial Chemicals having a melt flow of 2.43), with varying amounts of a dialkyl peroxide. The peroxide was employed as a 20% solution in mineral oil (Tufflo 6056, manufactured by Atlaantic Richfield Co.).

The product was obtained by extruding the polymers and the peroxide in a Brabender (¾") extruder using a melt temperature of 220° to 230° C. The results are presented below in Table 1. In some of the blends, a small amount of Kraton ® G Thermoplastic Rubber (a selectively hydrogenated styrene-butadiene-styrene block copolymer designated "G") was added as an impact modifier.

TABLE 1

| Blend (% w) | | | Melt Flow, Condition L at various peroxide levels (% w of 20% w solution) | | | | | | |
|---|---|---|---|---|---|---|---|---|---|
| PP | HDPE | G | 0 | 0.1% | 0.2% | 0.3% | 0.4% | 0.5% | 0.6% |
| 80 | 20 | 0 | 6.0 | 12.0 | 19.0 | 20.0 | 37.0 | 47.0 | 58.0 |
| 80 | 15 | 5 | 3.4 | 9.0 | 16.0 | 24.5 | 34.0 | 45.5 | 60.0 |
| 80 | 10 | 10 | 3.4 | 8.5 | 16.0 | 25.0 | 34.5 | 49.5 | 54.0 |
| 100 | 0 | 0 | 3.5 | 15.5 | 28.5 | 47.5 | 69.0 | 101 | — |

ILLUSTRATIVE EMBODIMENT II

In Illustrative Embodiment II injection-molded plaques of polypropylene (PP)-high density polyethylene (HDPE) blends which had been reacted with peroxide (in mineral oil) in an extrusion process (described in I) were cut into one-inch wide strips and tested for heat sag resistance.

Three basically different polymer compositions were examined. Blend A and Blend B (according to the invention) comprised 20% w HDPE (LB-861) plus 80% PP (Shell PP5520) plus a 20% peroxide-mineral oil solution. In Blend B the HDPE was given extra cross-linking by prior reaction with the peroxide. All three components were extruded together and pelletized at 230° C. Blend C (outside the invention) comprised polypropylene (without HDPE, extruded one time). Separate test showed that the peroxide was completely consumed in the extrusion/pelletizing process.

At varying levels of 20% peroxide in mineral oil solution (0,0.1 and 0.2%), two of the three compounds extruded were blends with HDPE; the third being the control was polypropylene alone. No difficulty took place during the extrusion process using a high compression screw at zone temperatures of 220, 230, 230, 230° C. for the four heating zones. Extruder speed was at 160 to 200 rpm. Measured melt flow of the compounds are tabulated in Table 2.

For reproducibility and better control, injection-molding was used to form specimens. Plaques of specification 4"×4"×125 mils were injection-molded from a Van Dorn machine at a melt temperature of 475° F. Timing of the molds were at 5, 20, 20 seconds. Plaques produced were then cut into one-inch width strips to fit the small stainless jig used for the sag resistance test.

Supported and clamped at one end in a horizontal position, the specimen was heated inside a closed oven for specified temperature and time. Sagging tests were conducted at temperature 165° to 180° C. at times 5 to 30 minutes. Sag or droop was measured as the angle from the horizontal assumed by the unsupported end of the strip.

Among the test conducted, the 180° C., 15 minutes showed the most dramatically different results. Both blended materials showed better melt strength over the control at comparable melt flow index (see visual description of material in Table 2.) Melting and flowing occurred most on the control (Blend C) followed by Blend B. Blend A was superior and indicated highest melt strength and sag resistance, in spite of somewhat higher melt flow index in the comparisons.

TABLE 2

MEASURED MELT FLOW AND VISUAL DESCRIPTION OF PRODUCT TESTED FOR HEAT SAG TESTS

| Blend/ Compound | % Peroxide in Oil Solution Reactor | Measured Melt Flow[a] | Visual Description |
|---|---|---|---|
| A | None | 5.8 | Only slight drooping, exhibited very good dimensional stability, melt strength superior to Blends B and C. |
| 20% HDPE/80% PP | 0.1 | 11.3 | |
| + peroxide solution (Components blended in one-step extrusion) | 0.2 | 18.0 | |
| B | None | 3.1 | Slightly distorted, flowed more than Blend A demonstrated by thinning and non-uniformity of material. Melt strength better than Blend C, but less than A. |
| 20% HDPE/80% PP | 0.1 | 9.9 | |
| + peroxide solution (HDPE preblended and reacted with 0.08% peroxide solution) | 0.2 | 18.6 | |
| C | None | 4.9 | Excessive sag and distortion on samples with 0.1 and 0.2 peroxide solution. |
| Control PP | 0.1 | 14.8 | |
| | 0.2 | 27.8 | |

[a]Melt flow measured at ASTM Condition "L".

ILLUSTRATIVE EMBODIMENT III

In Illustrative Embodiment III various thermoforming experiments were performed using a commerical vacuum-forming instrument (Comet Industries, Bensenville, Ill., Model 30×36). The mold was a "tote-box" 12W ×15L ×5D inches and extruded sheets were used (16W×22L×1/8T inches). Two different polypropylenes and two different high density polyethylenes were used. When the composition was a blend of HDPE and PP, the ratio of PP to HDPE was 80% to 20% w. "$P_s$" refers to content of 20% solution of peroxide i mineral oil before the pelletizing process. Table 3 indicates that the blends all showed manageable sag, comparable to that of the fractional melt flow propylene, even though their respective melt flows were much higher. The 5.0 MF polypropylene which had melt flow comparable to those of the blends, had uncontrollable sag and could not be thermoformed.

Table 4 gives the results of actually forming the articles with somewhat lower melt flows on the blends, obtained for 75/25 and 80/20 blends with 0.1% $P_s$ initial concentration. Also given as the minimum and maximum heater times which could be used as an estimate of the applicable temperature range "window". Note here also that the articles could only be formed with either the blends or a fractional melt flow polypropylene.

TABLE 3

SAG TESTS OF CRACKED PP/PE SHEETS[3] OBSERVED AT COMET THERMOFORMER

| Sample No. | Composition | Melt Flow[1] | Approx. Sag Time (Sec)[2] | View Temp. @ Given Heater Time | Sag Formation of Cooled Sheet |
|---|---|---|---|---|---|
| 1 | PP#1 | 5.0 | — | 237° C. | Droop very great, uncontrollable |
| 2 | PP#2 | 0.7 | 68 | 232° C. | Droop moderate (bell shaped) |
| 3 | PP#2 + HDPE#1 + 0.1% $P_s$ | 3.5 | 78 | 239° C | Droop moderate (elongated) |
| 4 | PP#2 + HDPE#1 + 0.2% $P_s$ | 6.5 | 78 | 241° C. | Droop moderate (elongated) |
| 5 | PP#2 + HDPE#2 + 0.1% $P_s$ | 3.0 | 74 | 240° C. | Droop moderate (bell shaped) |
| 6 | PP#2 + HDPE#2 + 0.2% $P_s$ | 4.8 | 74 | 238° C. | Droop moderate (bell shaped) |

[1]Melt flow at ASTM Condition "L".
[2]Sag time recorded when sheet sags to a given deflection without wrinkles while under heater.

TABLE 4

FORMING LIMITS OF CRACKED PP/PE BLENDS THROUGH VACUUM FORMING

| Sample No. | Composition | PP/HDPE % Blending Ratio | Melt Flow Condition L | HEATER TIME Min. | HEATER TIME Max. | THERMOFORMING CAPABILITY Yes | THERMOFORMING CAPABILITY No |
|---|---|---|---|---|---|---|---|
| 7 | PP#1 | 100% | 5.0 | 36 | 38 | | X |
| 8 | PP#2 | 100% | 0.7 | 44 | 48 | X | |
| 9 | PP#2 + HDPE#2 | 80/20 | 0.9 | 44 | 54 | X | |
| 10 | PP#2 + HDPE#2 | 75/25 | 0.9 | 44 | 54 | X | |
| 11 | PP#2 + HDPE#2 + 0.1% $P_s$) | 80/20 | 3.0 | 44 | 50 | X | |
| 12 | PP#2 + HDPE#2 + 0.1% $P_s$) | 75/25 | 2.2 | 44 | 50 | X | |

NOTE: Top and bottom heater were at "90%" level with temperature indicator readings of 700° F. and 400° F., respectively.

ILLUSTRATIVE EMBODIMENT IV

In this embodiment, impact strength of the thermoformed sheet made using the basic formulation of the invention, namely polypropylene/polyethylene blend with subsequent reaction with peroxide, is greatly improved by incorporation of up to 20% rubber masterbatch into the blend before reaction. One rubber masterbatch used is referred to as MB2-V and consists of equal quantities by weight of high density polyethylene (Allied's AA 60003) and ethylene/propylene rubber (Exxon's Vistalon 404). Thermoforming properties are retained while impact strength is greatly improved. The formulations and results are presented below in Tables 5, 6 and 7. Note that the material was cracked at 0.1% peroxide solution (20% LUPERSOL 101 in 80% TUF-FLO 6056) ($P_s$) using Welex 2½" extruder. Melt flow values ("L" Condition):

MB2-V=0.4
HDPE LB 730=0.3
HDPE AA60003=0.4

Impact strength at both RT and 0° F. are significantly improved for all the blends increasing with the amount of MB2-V added. Thermoforming capability of the blends was equal to or better than blends without MB2-V illustrated in Table 4.

shown in Table 8 below, a general improvement in mechanical properties were evident on PP/PE blends with or without reaction with 0.1% peroxide solution in an extrusion process. Injection-molded bars and plaques tested at room temperature showed increase of ductility as reflected in higher falling weight impact strength, lower flexural stiffness, and higher elongation. Somewhat lower tensile strength was also apparent. Significant differences in the melt flow curves were also evident, showing decreased viscosity and decreased shear succeptibility with increase in cracking level.

ULLUSTRATIVE EMBODIMENT VI

In this embodiment, a crosslinking efficiency improver is added to improve the crosslinking level of the polyethylene and/or MB2-V for a given amount of peroxide, allowing greater freedom in choice of cracking level selected. Ricon 151 (manufactured by Colorado Chemical Specialties) is a liquid 1,2polybutadiene

TABLE 5

FORMULATION AND MELT FLOW OF CRACKED PP/PE/MB2-V BLENDS

| MATERIAL FORMULATIONS | MF (g/10 MINUTES) "L"CONDITION |
|---|---|
| 5520 PP (Control) | 4.9 |
| 5072 PP (Control) | 0.9 |
| PR-1 (10% MB2-V + 20% LB 730 + 70% 5072 + 0.1% $P_s$) | 2.3 |
| PR-2 (20% MB2-V + 20% LB 730 + 60% 5072 + 0.1% $P_s$) | 2.1 |
| PR-3 (10% MB2-V + 20% AA60003 + 70% 5072 + 0.1% $P_s$) | 2.4 |
| PR-4 (20% MB2-V + 20% AA60003 + 60% 5072 + 0.1% $P_s$) | 1.7 |
| PR-5 (5% MB2-V + 20% AA60003 + 75% 5072 + 0.1% $P_s$) | 2.5 |

TABLE 6

VISUAL SHEET - SURFACE APPEARANCE OF CRACKED PP/PE/MB2-V BLENDS AND PURE PP CONTROLS

| MATERIAL | % MB2-V | VISUAL OBSERVATION[a] |
|---|---|---|
| 5520 PP | 0 | Very smooth and glossy |
| 5072 PP | 0 | Streaks all over sheet with numerous crowfoot marks |
| PR-1 | 10 | Smooth and glossy |
| PR-2 | 20 | Smooth and glossy with some dimples |
| PR-3 | 10 | Smooth with straight line mark at center, showing scratches |
| PR-4 | 20 | Smooth with straight line mark at center |
| PR-5 | 5 | Smooth, showing streaks |

TABLE 7

IMPACT RESISTANCE OF PURE PP AND CRACKED PP/PE/MB2-Y BLENDS

| | | IMPACT RESISTANCE | | | | | |
|---|---|---|---|---|---|---|---|
| | | ROOM TEMPERATURE | | | 0° F. | | |
| MATERIAL | % MB2-V | NOTCHED IZOD (Ft-Lb/In) | GARDNER IMPACT (In-Lb) | FALLING WEIGHT IMPACT (Ft-Lbs/In) | NOTCHED IZOD (Ft-Lb/In) | GARDNER IMPACT (In-Lb) | FALLING WEIGHT IMPACT (Ft-Lb/In) |
| 5520 | 0 | 0.56 | 10.9 | 80.1 | 0.32 | 1.47 | <15 |
| 5072 | 0 | 0.72 | 10.0 | 76.3 | 0.34 | 1.50 | <15 |
| PR-1 | 10 | 2.27 | 200 | 162 | 0.77 | 215 | 132 |
| PR-2 | 20 | 13.4 | 217 | 165 | 1.79 | 299 | 177 |
| PR-3 | 10 | 2.62 | 209 | 158 | 0.71 | 287 | 136 |
| PR-4 | 20 | 11.98 | 228 | 166 | 2.40 | 205 | 180 |
| PR-5 | 5 | 0.96 | 220 | 184 | 0.39 | 10.8 | 18.9 |

ILLUSTRATIVE EMBODIMENT V

In this embodiment comparisons were made between cracked and uncracked blends and unblended polypropylene. ("Cracking" refers to the prior reaction with peroxide. Actually the polypropylene component is cracked. The PE or MB2-V components are crosslinked. Overall effect is increase of melt flow.) As resin claimed to improve crosslinking efficiency in polyolefinic materials used with peroxide. By way of example when Blend PR-3 (Table 5) in Embodiment IV incorporated 5% of Ricon 151 (relative to weight of MB2-V plus HDPE) melt flow of product was reduced to 1.6 from the 2.3 melt flow value obtained without Ricon 151.

TABLE 8

PHYSICAL PROPERTIES OF CRACKED AND NON-CRACKED PP/PE BLENDS

| BLEND COMPOSITION | % BLEND RATIO (PP/PE) | MELT FLOW (g/10 Min) | YELLOWNESS INDEX (L, A, B) | ROCKWELL HARDNESS | R.T. NOTCHED IZOD | R.T. FWIS (ft-lb/in) |
|---|---|---|---|---|---|---|
| PURE DP 5072 PP | | 0.8 | 0.27 | 92 | 0.91 | 2.4 |
| (DP 5072 + LB 730) | 75/25 | 0.9 | 5.13 | 85 | 1.68 | 183 |
| (DP 5072 + LB 730) | 80/20 | 0.9 | 5.57 | 88 | 1.59 | 159 |
| (DP 5072 + LB 730 + 0.1% P$_s$) | 75/25 | 2.2 | 4.35 | 85 | 0.98 | 152 |
| (DP 5072 + LB 730 + 0.1% P$_s$) | 80/20 | 2.8 | 4.19 | 87 | 0.89 | 160 |

| BLEND COMPOSITION | FLEX MODULUS @ 0.05"/min (psi) | FLEX MODULUS @ 0.05"/min 1% Secant | R.T. TENSILE (2"/Minute) YIELD | R.T. TENSILE (2"/Minute) @ BREAK | R.T. TENSILE (2"/Minute) @ ELONGATION BREAK | R.T. TENSILE (0.2"/Minute) YIELD | R.T. TENSILE (0.2"/Minute) 1% SECANT | GARDNER IMPACT ENERGY ABSORPTION (in-lbs) |
|---|---|---|---|---|---|---|---|---|
| PURE DP 5072 PP | 207,000 | 201,000 | 4960 | 1910 | 43 | 4420 | 207,000 | 21 |
| (DP 5072 + LB 730) | 197,000 | 192,000 | 4830 | — | 112 | 4160 | 178,000 | — |
| (DP 5072 + LB 730) | 195,000 | 189,000 | 4890 | — | 105 | 4330 | 184,000 | 47 |
| (DP 5072 + LB 730 + 0.1% P$_s$) | 171,000 | 167,000 | 4540 | 1420 | 94 | 3940 | 172,000 | 26 |
| (DP 5072 + LB 730 + 0.1% P$_s$) | 171,000 | 168,000 | 4660 | 1120 | 71 | 4080 | 186,000 | 27 |

What is claimed is:

1. In a process for manufacturing molded articles by thermoforming crystalline polymer sheets, the improvement wherein said sheets are extruded from a polymer composition prepared by the peroxide reacting of the mixture of:
   (a) 65 to 95 percent by weight of a mixture of about 50 to about 96 percent by weight of a crystalline isotactic poly(alpha-olefin) selected from the group consisting of polypropylene and polybutylene and about 50 to about 4 percent by weight of a polyethylene;
   (b) 5 to 35 percent by weight of an impact modifier; and
   (c) an effective amount of a 1,2 polybutadiene crosslinking efficiency improver.

2. The process according to claim 1 wherein said poly(alpha olefin) is polypropylene.

3. The process according to claim 1 wherein said poly(alpha-olefin) is polybutylene.

4. The process according to claim 1 wherein said polyethylene is high density polyethylene.

5. The process according to claim 1 wherein said sheets are thermoformed at a temperature between the melting point of said poly(alpha-olefin) and 60° C. above said melting point.

6. The process according to claim 1 wherein said thermoforming process comprises mechanical stamping of said sheets at a temperature between the melting point of said poly(alpha-olefin) and 40° C. above said melting point.

7. The process according to claim 1 wherein said mixture of step (a) comprises between about 90 weight percent and about 60 weight percent poly(alpha-olefin) and between about 10 weight percent and 40 weight percent polyethylene.

8. The process according to claim 1 wherein said peroxide reacting comprises contacting the mixture of said poly(alpha-olefin), said polyethylene, said impact modifier and said crosslinking efficiency improver in an extruder in the presence of between about 150 and about 1,000 ppmw of a peroxide at a temperature of between about 190 and about 250° C.

9. The process according to claim 8 wherein said peroxide is 2,5-dimethyl-2,5-di(t-butylperoxy)hexane.

10. The process of claim 1 wherein said impact modifier is selected from the group consisting of:
    (i) a blend of a polyethylene and an ethylene-propylene rubber; and
    (ii) a selectivity hydrogenated styrene-butadiene-styrene block copolymer.

11. The process of claim 1 wherein said impact modifier is a blend of a polyethylene and an ethylene-propylene rubber.

12. A product obtained by contacting the mixture of:
    (a) 95 to 65 percent by weight of a mixture of about 50 to about 96 percent by weight of a crystalline isotactic poly(alpha-olefin) selected from the group consisting of polypropylene and polybutylene and about 50 to about 4 percent by weight of a polyethylene;
    (b) 5 to 35 percent by weight of an impact modifier; and
    (c) an effective amount of 1,2 polybutadiene crosslinking efficiency improver in an extruder in the presence of about 150 to about 1000 ppmw (based on the total polymer content of said mixture) of a peroxide at a temperature of between about 110° C. and about 250° C.

13. The product of claim 12 wherein said peroxide is 2,5-dimethyl-2,5-di(t-butylperoxy)hexane.

14. The product of claim 12 wherein said crosslinking efficiency improver is added to improve crosslinking of the polyethylene and impact improver masterbatch, relative to the cracking of the polypropylene or polybutylene.

15. The product of claim 12 wherein said crystalline isotactic poly(alpha-olefin) is a propylene copolymer.

16. The product of claim 13 wherein said crystalline isotactic poly(alpha-olefin) is an impact polypropylene.

17. The product of claim 12 wherein said polyethylene is high density polyethylene.

18. The product of claim 12 wherein said impact modifier is selected from the group consisting of:
   (i) a blend of a polyethylene and an ethylene-propylene rubber; and
   (ii) a selectively hydrogenated styrene-butadiene-styrene block copolymer.

19. The product of claim 12 wherein said impact modifier is a blend of a polyethylene and an ethylene-propylene rubber.

* * * * *